United States Patent
Burk

(10) Patent No.: US 9,783,025 B2
(45) Date of Patent: Oct. 10, 2017

(54) METHOD FOR COOLING AND/OR HEATING MEDIA, PREFERABLY IN A MOTOR VEHICLE, AND A SORPTIVE HEAT AND COLD STORAGE SYSTEM

(71) Applicant: MAHLE International GmbH, Stuttgart (DE)

(72) Inventor: Roland Burk, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 288 days.

(21) Appl. No.: 14/539,659

(22) Filed: Nov. 12, 2014

(65) Prior Publication Data

US 2015/0129160 A1    May 14, 2015

(30) Foreign Application Priority Data

Nov. 13, 2013 (DE) ........................ 10 2013 223 149

(51) Int. Cl.
*B60H 3/00* (2006.01)
*B61D 27/00* (2006.01)
*B60H 1/32* (2006.01)
*F25B 29/00* (2006.01)
*F25B 17/00* (2006.01)
*F25B 27/02* (2006.01)
*F25B 25/00* (2006.01)

(52) U.S. Cl.
CPC ........... *B60H 1/3201* (2013.01); *F25B 17/00* (2013.01); *F25B 27/02* (2013.01); *F25B 29/006* (2013.01); *F25B 25/005* (2013.01)

(58) Field of Classification Search
CPC ........ B60H 1/3201; F25B 17/00; F25B 27/02; F25B 29/006; F25B 25/005
USPC .......................................................... 165/42
See application file for complete search history.

(56) References Cited

U.S. PATENT DOCUMENTS

| | | | | |
|---|---|---|---|---|
| 1,904,024 A * | 4/1933 | Wright | .................... | F25B 17/00 62/143 |
| 2,592,712 A * | 4/1952 | Knoy | ...................... | F25B 27/02 62/101 |
| 4,577,471 A * | 3/1986 | Meckler | ................ | F24F 3/1417 62/235.1 |
| 4,635,446 A * | 1/1987 | Meckler | ............... | B01D 53/263 62/235.1 |

(Continued)

FOREIGN PATENT DOCUMENTS

| DE | 199 27 879 C2 | 3/2003 |
|---|---|---|
| DE | 10 2006 048 485 A1 | 4/2008 |

(Continued)

OTHER PUBLICATIONS

Erich Rummich, "Energiespeicher Grundlagen, Komponenten, Systeme and Anwendungen," Renningen, expert, pp. 11-113 (2009).

*Primary Examiner* — Justin Jonaitis
(74) *Attorney, Agent, or Firm* — Muncy, Geissler, Olds & Lowe, P.C.

(57) ABSTRACT

A method and device for cooling and/or heating media, preferably in a motor vehicle, the method in which at least one first heat source is cooled and at least one second heat sink is heated by a thermal management system. In a method in which the heating or cooling can occur on demand, heat and/or cold are shifted by the thermal management system in space and time to the heat sink and/or heat source, which is characterized by need.

11 Claims, 4 Drawing Sheets

(56) References Cited

U.S. PATENT DOCUMENTS

| | | | |
|---|---|---|---|
| 5,628,205 A * | 5/1997 | Rockenfeller | C09K 5/047 |
| | | | 62/112 |
| 5,823,003 A | 10/1998 | Rosser, Jr. et al. | |
| 8,316,659 B2 | 11/2012 | Bouysset et al. | |
| 2008/0087402 A1 | 4/2008 | Burk | |
| 2012/0000220 A1 * | 1/2012 | Altay | B64D 13/06 |
| | | | 62/101 |
| 2013/0192281 A1 * | 8/2013 | Nam | B60H 1/3201 |
| | | | 62/101 |

FOREIGN PATENT DOCUMENTS

| | | |
|---|---|---|
| DE | 10 2008 053 828 A1 | 5/2010 |
| DE | 10 2008 037 595 A1 | 6/2010 |
| DE | 10 2010 048 867 A1 | 4/2012 |
| EP | 1 342 893 B1 | 5/2010 |

* cited by examiner

METHOD FOR COOLING AND/OR HEATING MEDIA, PREFERABLY IN A MOTOR VEHICLE, AND A SORPTIVE HEAT AND COLD STORAGE SYSTEM

This nonprovisional application claims priority under 35 U.S.C. §119(a) to German Patent Application No. DE 10 2013 223 149.0, which was filed in Germany on Nov. 13, 2013, and which is herein incorporated by reference.

BACKGROUND OF THE INVENTION

Field of the Invention

The invention relates to a method for cooling and/or heating media, preferably in a motor vehicle, and to a sorptive heat and cold storage system.

Description of the Background Art

Internal combustion engines with their high level of development represent an ideal power-heat-coupled drive of a vehicle. In the winter, a notable portion of the waste heat from the internal combustion engine is used for heating an interior of the motor vehicle. Nevertheless, the inappropriate time distribution of the available waste heat and the heat requirement for heating components, such as the internal combustion engine itself and the vehicle cabin, are problematic. At the start of driving, the cold engine works at a low efficiency due to increased friction and incomplete fuel combustion. Driving safety simultaneously requires rapid defrosting of iced-up or fogged windows and the vehicle occupants desire as rapid a heating of the interior as possible. At the start of driving, therefore, especially in winter there is a high heat requirement, which cannot be covered so rapidly by the internal combustion engine. During and at the end of a drive, in contrast, the internal combustion engine is so warm that excess heat, primarily in the summer, must be removed to the outside to prevent overheating.

Various systems based on thermally isolated water and latent heat storage systems are known for storing engine heat for later more rapid engine preheating and/or windshield de-icing. There are systems, which in most cases are based on phase-change materials, for short-term cold storage as well. Efficient indirect charge air cooling systems are also prior in the art, which utilize the thermal capacity of a coolant circuit in order to briefly transfer high cooling capacities to the charge air of the internal combustion engine. Because the coolant is cooled by the ambient air, however, this temperature or values below it cannot be reached. Measures to prevent critically high combustion temperatures, which can lead to engine-damaging knocking, are engine-related measures that are associated with rather high efficiency losses and an increase in emissions, however.

EP 1 342 893 B1 discloses a device with which charge air is cooled by addition of an evaporator to the compression cooling device for vehicle air conditioning as needed by further cooling of a cooling circuit below the ambient temperature.

DE 10 2006 048 485 A1, which corresponds to US 20080087402, which is incorporated herein by reference, proposes an evaporator, which is disposed directly at the intake system of an internal combustion engine and transfers the cold produced by evaporation directly and with low inertia to the intake air near the engine.

DE 199 27 879 C2 describes a concept for an adsorption cooling system for air conditioning vehicles with two adsorbers that are used as thermal compressors to condense operating media in a central condenser and after expansion to evaporate it in an evaporator with the uptake of heat for cooling the vehicle cabin. Such an adsorption cooling system could also be used basically for cooling the charge air of an internal combustion engine. It is disadvantageous that the concept cannot be used for storing cold in order, e.g., to briefly cool in addition charge air of a highly charged internal combustion engine during an on-demand full-load operation so greatly that the knock limit is not reached.

In other conventional art, however, it is disadvantageous that a cooling capacity is transferred via a coolant to the charge air, as a result of which additional cooling capacity can be transferred only with high inertia to the charge air. In addition, the cooling capacity is obtained by additional operating power of a coolant compressor and thereby reduces the efficiency. Also, the demand for cold proceeds at the expense of the driving power of a cooling compressor and thereby takes mechanical power away from the internal combustion engine.

SUMMARY OF THE INVENTION

It is therefore an object of the present invention to provide a method for cooling and/or heating media and a heat and cold storage system, in which thus far unused heat is used advantageously in the motor vehicle.

An exemplary embodiment relates to a method for cooling and/or heating media, preferably in a motor vehicle, the method in which a thermal management system is used, which cools at least one first heat source and heats at least one second heat sink. In this case, heat and/or cold are shifted in space and time to the heat sink and/or heat source, which is characterized by demand. This embodiment has the advantage that only one thermal management system can be used in a motor vehicle for preheating the internal combustion engine in a cold start, for defrosting a windowpane, for the more rapid heating of a vehicle cabin, and/or for transformation to cooling for the temporary additional cooling of charge air, and/or for pre-air conditioning a vehicle cabin. Thus, an energy exchange occurs both from hot to cold and from cold to hot in one and the same device.

Advantageously, a sorptive thermal storage system of the temperature management system is charged by desorption of a drained off, warm, gaseous operating medium from a sorbent and its condensation and storage in a fluid collector at the ambient temperature. An on-demand discharge occurs by opening an expansion element, over which operating media flow into an evaporator at reduced pressure and can evaporate there with heat absorption from a fluid to be cooled. The suction vapor is supplied to a sorbent, and the heat can be used for heating another medium by physisorption or chemisorption. Thus, heat transport, variable in time and space, occurs between freely selectable heat sources and heat sinks with a different temperature level by one and the same system.

The invention can use a fluid collector. However, alternatively a fluid storage device can also be used in general, whereby the fluid collector is a type of such a fluid storage device.

An embodiment of the invention relates to a sorptive heat and cold storage system, preferably for a motor vehicle, with a thermally driven condensing unit. In the case of a sorptive heat and cold storage system, in which unused heat from the internal combustion engine is distributed in the motor vehicle, the thermally driven condensing unit has a sorption reactor, comprising a solid or liquid sorption agent, and a condenser connected to the sorption reactor, whereby the condensing unit is connected to a fluid collector, which is connected via a closable expansion valve to an evaporator for cooling a fluid or gaseous medium, which is connected to the condensing unit. Heat distribution within a vehicle, for example, can occur on demand by means of such a sorptive heat and cold storage system, if it is connected to a heat sink and a heat source. In this regard, heat sinks can be heated and optionally heat sources can also be cooled simultaneously.

At least one operating medium valve for preventing backflow of the operating medium vapor from the sorption reactor to the evaporator can be connected to the sorption reactor. It is prevented thereby that operating medium vapor flows into the evaporator during the desorption of the heat and/or cold storage system and condenses there and thereby heats the evaporator in an unwanted manner. Preferably, said valve is made as a nonreturn valve, check valve, or the like.

In an embodiment, the condenser leads to the fluid collector, whereby a condensate valve is arranged between the condenser and the fluid collector to prevent the return of condensed operating medium to the sorption reactor. This assures that both in the sorption reactor and in the evaporator the operating medium occurs only in the gaseous physical state, as is necessary there for the functional process taking place.

In an embodiment, the sorption reactor can be made modular, whereby at least two modular sorption reactors are connected between the evaporator and the fluid collector. This offers the possibility that the heat and cold storage system can be charged and discharged simultaneously, in order to realize a quasi-continuous heat pump function by means of a fluid management system.

In an embodiment, the sorption reactor can be connected to a plurality of alternative heat sinks.

In an embodiment, the heat sink can be formed as the vehicle cabin and/or heating system of a motor vehicle, whereby a heat source, connected to the condensing unit, is configured as an exhaust gas heat exchanger of the motor vehicle. Thus, the hot and cold flows arising in a motor vehicle can be advantageously redirected or stored.

In an embodiment, air to be cooled by the evaporator can be provided by a charge air cooler of the vehicle and is cooled further by it as needed, e.g., in order to prevent a knocking combustion during the full load phase of the engine during acceleration processes. Thus, the fluid to be cooled by the evaporator is not provided separately, but the air present in the vehicle per se can be used for the thermal management system.

In an embodiment, an internal combustion engine of the vehicle, which is arranged in a heating circuit formed by the condensing unit and the heat sink, is arranged downstream of the evaporator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
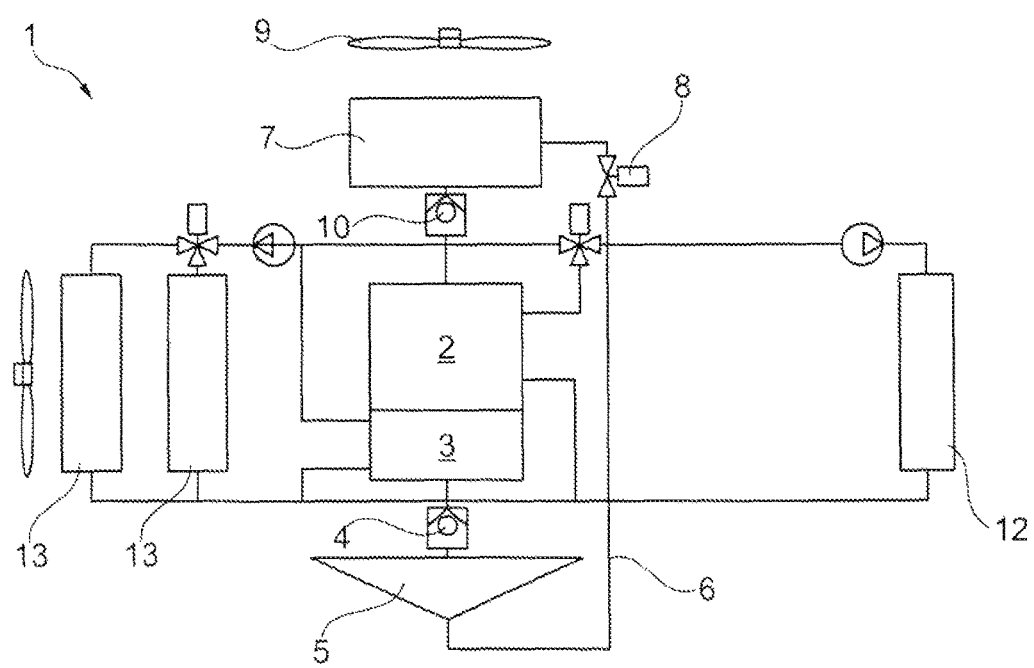
FIG. 1 shows an exemplary embodiment of a heat and cold storage system of the invention.

FIG. 1 shows a sorptive heat and cold storage system 1. This sorptive heat and cold storage system 1 includes a sorption reactor 2, which contains a solid or liquid sorption agent and to which a condenser 3 is connected. Advantageously, sorption reactor 2 and condenser 3 are combined as a component into a condenser unit module, but can also be formed separately. Condenser 3 is connected via a condensate valve 4 to a fluid collector 5. Fluid collector 5 leads via an operating medium line 6 to an evaporator 7. A closable expansion valve 8 is arranged in operating medium line 6 between fluid collector 5 and evaporator 7. Evaporator 7 is used to cool a fluid. In this case, the fluid is air, which is conveyed from a fan 9 arranged near the evaporator.

Sorption reactor 2 has an operating medium valve 10, which prevents operating medium vapor from flowing into evaporator 7 during desorption and condensing there. The operating medium valve, made as a second condensate valve 4, arranged between condenser 3 and the fluid collector, and also formed as check valve, prevents an already condensed operating medium from flowing back into sorption reactor 2 during the absorption or adsorption phase. Preferably, sorption reactor 2 and condenser 3 are disposed in a shared housing.

A heat transfer fluid from a hot heat source 12 or from a cool heat sink 13 can flow around sorption reactor 2 via a further valve 11, in order to heat sorption reactor 2 in phases and to supply and cool the heat of desorption, in order to transfer the heat of sorption to one of the heat sinks 12, 13.

Heat source 12 is the exhaust gas from an internal combustion engine, for example, whose heat is transferred by means of an exhaust gas heat exchanger to a heat transfer fluid. But other heat sources such as a fuel heater, for example, can also be considered. At least one engine component to be heated, preferably an engine block, the cabin air, or ambient air is used as heat sink 13. Particularly in stationary applications, there are a plurality of other objects or fluids, which are to be heated to a moderate level, such as, for example, the central heating network of a building. As is evident from FIG. 1, a plurality of heat sinks can be supplied parallel to one another or alternatively by the heat and cold storage unit.

Figure 2:
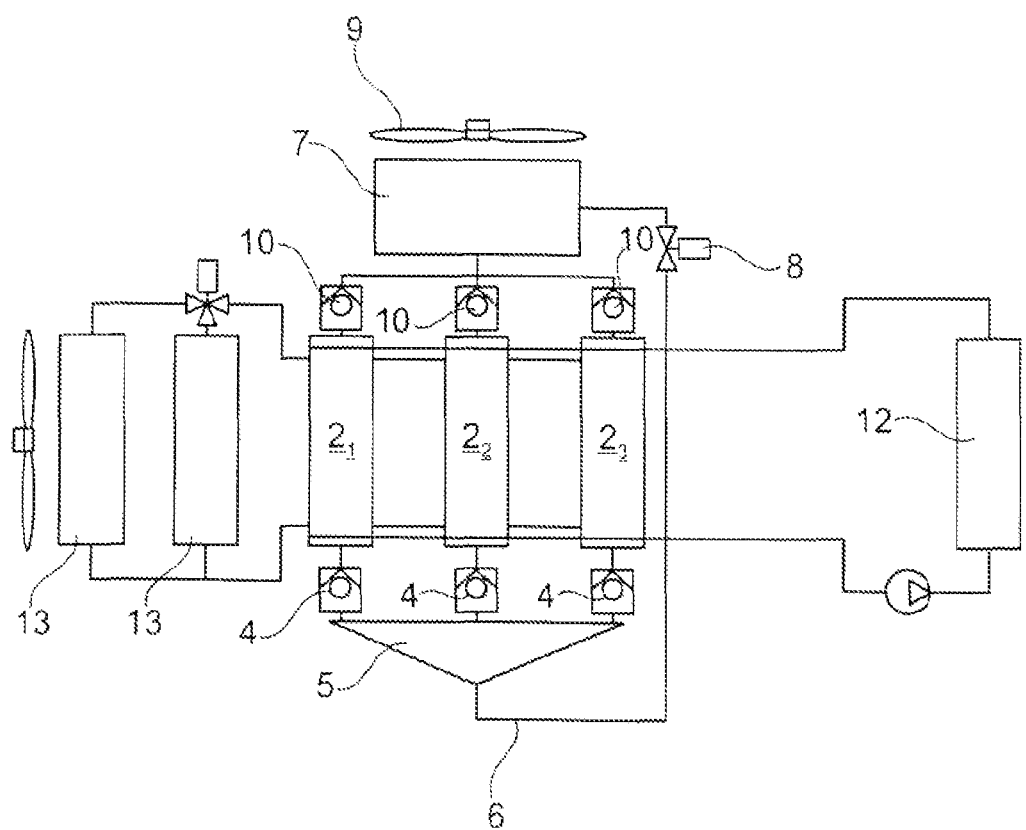
FIG. 2 shows an exemplary embodiment of a heat and cold storage system of the invention.

To increase the availability of stored cold energy from engine waste heat, as shown in FIG. 2, for example, three sorption reactors $2_1$, $2_2$, $2_3$ are used, whereby each sorption reactor $2_1$, $2_2$, $2_3$ is formed modular. Of these preferably three sorption reactors $2_1$, $2_2$, $2_3$, at least one can be desorbed, while at least one second one is held at a temperature close to the ambient temperature for the need-based uptake of operating medium vapor. The fluid management to be used for this purpose and the necessary valve are not more explicitly illustrated here. This is known from the background art.

A solid sorption agent, which is connected to a fluid guiding structure in a good heat-conducting manner, is used in each modular sorption reactor $2_1$, $2_2$, $2_3$. To remove the heat of condensation of a condenser integrated in this case, a second fluid guiding structure that is not explained in greater detail, is employed, with which advantageously a container wall of sorption reactor $2_1$, $2_2$, $2_3$ is held at the condensation temperature by being supplied with a cooling fluid, whereby the condensate flows down on the container wall, is collected there, and drained off via condensate valve 4 from sorption module $2_1$, $2_2$, $2_3$ into fluid collector 5.

Figure 3:
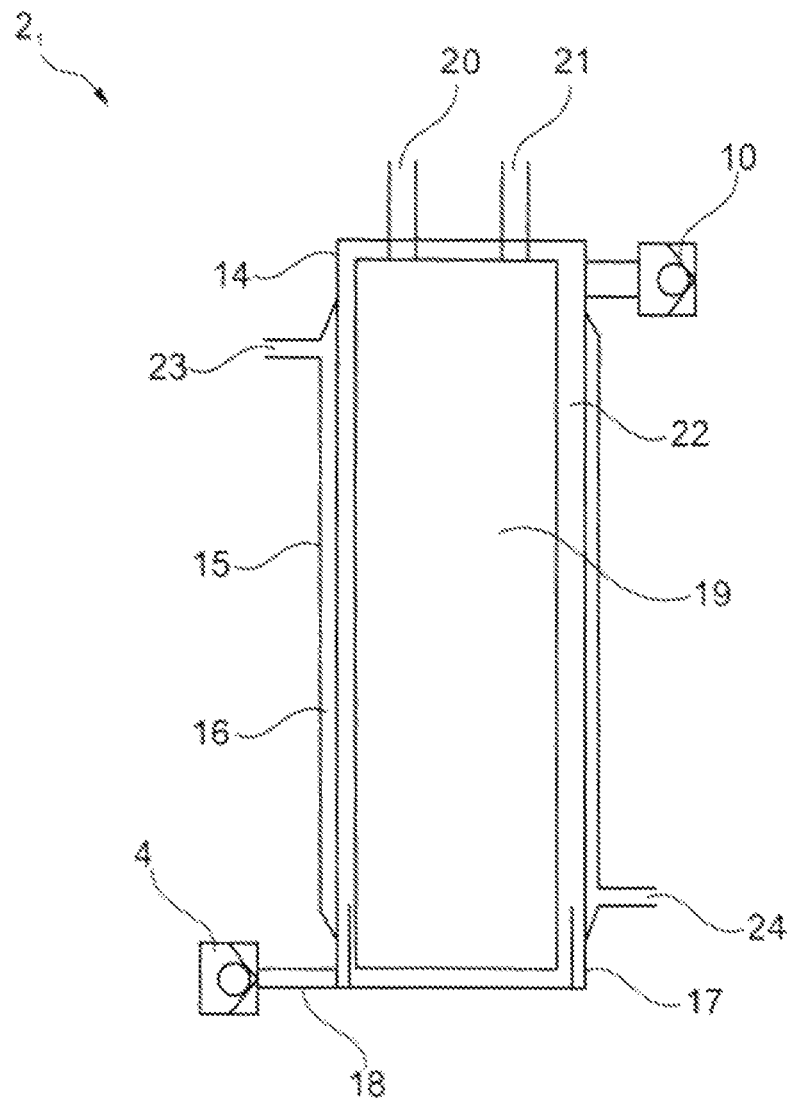
FIG. 3 shows an exemplary embodiment of a sorption reactor of the heat and cold storage system of the invention.

An advantageous embodiment of a modular sorption reactor $2_1$ (combined sorber/condenser), called a thermally driven condensing unit, is shown in FIG. 3. The modular sorption reactor $2_1$ in this case has a housing 14 that is of cylindrical design. The exterior wall of housing 14 is surrounded by a jacket 15, whereby an interspace 16 through which fluid can flow is formed between jacket 15 and the exterior wall of housing 14. Below this interspace 16 within operating medium space 22 an annular channel 17 is arranged that is connected to a condensate removal line 18, in which condensate valve 4 is arranged, and taken outward. The interior of housing 14 is equipped with a sorption heat exchanger 19 with two fluid connections 20, 21. This fluid guiding system 20, 21 is in thermal contact with a sorber structure (not shown further). Because of the at least one inlet 20 and outlet 21 of the fluid guiding system, sorption heat exchanger 19 can be thermally cycled by a heat carrier. By means of a thereby generated desorption and absorption or adsorption of the operating medium, a change in pressure is caused within an operating medium space 22, containing sorption heat exchanger 19.

The interspace 16, through which fluid can flow, of jacket 15 of housing 14 is part of a second fluid guiding system with connections 23, 24, which takes up the heat of condensation arising due to the providing of a coolant during the desorption phase of the sorber structure and thereby limits the operating medium pressure during the desorption phase to the condensation pressure. The condensate formed on the cooled inner surface of housing 14 runs down and is collected by the annular channel 17, open above, and is taken outward via condensate removal line 18 with condensate valve 4.

At any other location of housing 14, in the present case above right, there is also an operating valve 10, which is also designed as a check valve and which prevents operating medium vapor from flowing back from sorption reactor $2_1$ into evaporator 7.

On the basis of this embodiment, modular sorption reactor $2_1$, $2_2$, $2_3$ can fulfill the following functions. A change in pressure from the evaporation pressure to the condensation pressure is made possible as a first function. To this end, sorption heat exchanger 19 is supplied with flow by a heat carrier with an increasing temperature. The suction side operating medium valve 10 closes because of the associated increase in pressure.

The function, desorption and condensation, is realized in that sorption heat exchanger 19 is supplied further with the flow of a hot heat carrier, whereby the operating medium is desorbed at high pressure. The high pressure keeps the suction side operating medium valve 10 closed. The operating medium condenses on the cooled wall of sorption reactor $2_1$ and runs on the inside on jacket 15 into the annular channel 17, arranged at the bottom, where it leaves operating medium space 22 via condensate valve 4, designed for the fluid phase, and preferably enters fluid collector 5.

To realize the function of the change in pressure from condensation pressure to evaporating pressure, sorption heat exchanger 19 is supplied with a heat carrier with a decreasing temperature. Because of the associated pressure drop, the condensation comes to a standstill and the fluid-side condensate valve 4 closes. When the evaporating pressure is reached, operating medium valve 10 formed as a suction valve closes. To realize the vapor intake and absorption or adsorption, sorption heat exchanger 19 is supplied further with the recooled heat carrier, whereby operating medium is drawn in and sorbed at low pressure, provided the evaporator is running.

Otherwise, a low suction pressure is maintained until the cooling capacity is called up by opening of the expansion valve.

The function of vapor intake and absorption or adsorption is fulfilled in that sorption heat exchanger 19 is supplied with the recooled heat carrier, whereby the operating medium is drawn in and sorbed at low pressure.

Figure 4:
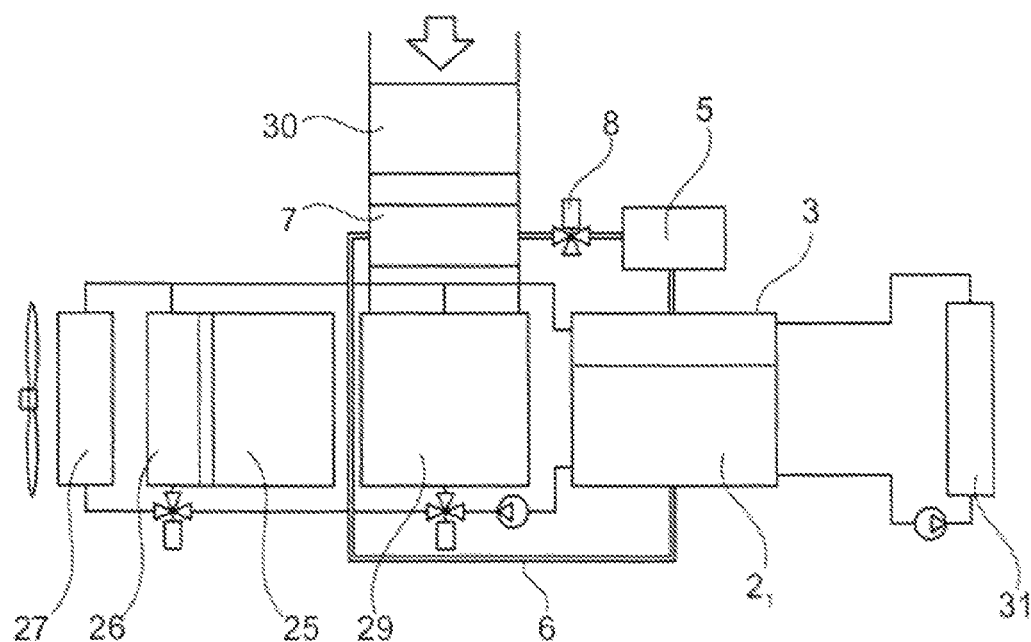
FIG. 4 shows an exemplary embodiment of the heat and cold storage system of the invention.

In FIG. 4, an application of the combined sorptive heat and cold storage system for a motor vehicle is designed and illustrated; it is based on a thermally driven condensing unit $2_1$ with three alternative heat sinks. The three alternative heat sinks, like heating element 26 for heating a vehicle cabin 25, an engine block 29, and a recooler 27, can be connected alternatively or simultaneously via switching valve 28 in the recooling circuit.

Via evaporator 7, at least as needed low-temperature heat is removed from a fluid or object to be cooled. In the present case, the charge air of an internal combustion engine 29 from charge air cooler 30 is thereby cooled further as needed continuously and/or during a high-load phase of internal combustion engine 29 by opening of the expansion valve. Such high-load phases are vehicle acceleration processes, for example. The charge air of internal combustion engine 29 is thereby cooled additionally until the combustion temperature remains below the knock limit and as a result the power density and the efficiency of internal combustion engine 29 are increased and/or harmful emissions reduced.

In an embodiment, there can be a second evaporator (not illustrated further) in the cooling circuit with which vehicle cabin 25 can be cooled or precooled directly or indirectly.

The described sorptive heat and cold storage system 1 is charged in that the at least one modular sorption reactor $2_1$ is desorbed with waste heat, preferably exhaust gas heat from exhaust gas heat exchanger 31, and the desorbed operating medium vapor is condensed in condenser 3 and taken via condensate valve 4 (see FIG. 3) to fluid collector 5. The thereby released heat of condensation is advantageously also transferred to the recooling circuit with the three present alternative heat sinks 26, 27, 29. After this process, sorption reactor $2_1$ is cooled to nearly the ambient temperature by the fluidic coupling of at least one of heat sinks 26, 27, 29. In this state, the thermal energy can be stored without losses until heat and/or cold is required by opening of expansion valve 8.

A heating demand exists, e.g., when internal combustion engine 29 is to be preheated to shorten the warm-up phase or when heating element 26 requires preheated water to defrost the windshield before driving is started. A cooling demand exists, e.g., when internal combustion engine 29 is brought to full power to carry out an overtaking process and knocking must be prevented by additional cooling of the charge air and/or vehicle cabin 25 or its enclosing surfaces are to be cooled.

To call up the stored thermal cold and/or heat energy, expansion valve 8 that has been kept closed thus far, is opened, as a result of which liquid operating medium, removed from fluid collector 5 in a metered manner, flows throttled through expansion valve 8 into evaporator 7, kept at the evaporation pressure level, and is evaporated there. In so doing, heat is removed from the fluid to be cooled in the form of charge air or interior air or the enclosing surfaces of the vehicle cabin. At the same time, the operating medium vapor is drawn into a sorption module or a plurality of precooled sorption modules $2_1$, $2_2$, $2_3$, as a result of which these heat up to the absorption or adsorption temperature and release heat to the cooling fluid. The thereby released heat of sorption can be supplied to one of the heat sinks (heating element 26, vehicle cabin 25, recooler 27, or internal combustion engine 29) in order to preheat these or to give off the heat to the environment.

The sorptive heat and cold storage system proposed here, based on the thermally driven condensing unit in the form of modular sorption reactors or condenser unit modules, makes it possible to provide better coverage of the supply and demand profiles, differentiated in time, of heat and/or cold in order to save primary energy and to reduce vehicle emissions.

Different functions can be fulfilled with the described sorptive heat and cold storage system. Thus, an application as a thermally driven heat pump for heating purposes is conceivable. For example, a fuel-operated heater, a condensing boiler, or the like is used as high-temperature heat. The heat sink represents the object to be heated, e.g., a building, a room, or a vehicle cabin. The heat of sorption and the heat of condensation are given off there at a medium temperature level. In the evaporator, low-temperature heat is taken up from the environment, e.g., from the outside air, from a geothermal probe, or a solar collector.

A further application relates to a thermally driven cooling system. Waste heat or heat from a fuel-operated heater is used as high-temperature heat. The environment is used as a heat sink to which the heat of sorption and heat of condensation are removed. In evaporator 7, low-temperature heat is taken up from a fluid, object, or space to be cooled and this is cooled thereby.

A further possible application is sorption cold or heat storage. With a closed, externally controllable expansion valve 8, cold energy can be accumulated and stored, in that one, several, or all sorption reactor modules $2_1$, $2_2$, $2_3$ are desorbed and the condensate formed thereby is stored in a fluid collector. This is dimensioned in its capacity so that it can take up the entire operating medium amount of all modular sorption reactors $2_1$, $2_2$, $2_3$. Then at least one or several, preferably all modular sorption reactors are brought to the recooling temperature, as a result of which the calling up of a high cooling or heating capacity is prepared. In the case of a cooling or heating demand, expansion valve 8 is opened or operated in the pulse width modulation method such that the desired evaporation capacity is released. Due to the operating medium vapor drawn in and sorbed by the modular sorption reactors, these heat up by the release of the heat of sorption, which can be used, e.g., for preheating a fluid of the internal combustion engine or other objects. Even during or after the calling up of the stored heat and cold energy, the desorption of the first sorption reactor module to establish the steady-state cooling capacity can be begun and/or all sorption reactors desorbed simultaneously for a later renewed calling up of heating or cooling.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for cooling and/or heating media in a motor vehicle, the method comprising:

cooling at least one first heat source and/or heating at least one second heat sink by a thermal management system; and shifting heat and/or cold via the thermal management system in space and time to the heat sink and/or heat source, wherein the shifting is performed based on demand of cooling of the heat source or on demand of heating of the heat sink, wherein the heat sink is formed as a vehicle cabin and/or a heating system of the motor vehicle, and wherein the heat source, connected to the thermal management system, is formed as an exhaust gas heat exchanger of the motor vehicle.

2. The method according to claim 1, wherein a sorptive thermal storage system of the temperature management system is charged by desorption and by condensation of an operating medium from a sorbent and its condensation and storage in a fluid storage device at the ambient temperature.

3. The method according to claim 2, wherein the fluid storage device is a fluid collector.

4. A sorptive heat and cold storage system for a motor vehicle, the system comprising:

a thermally driven condensing unit having a sorption reactor and a condenser connected to the sorption reactor; and a solid or liquid sorption agent;

wherein the thermally driven condensing unit is connected to a fluid storage device that is connected via a closable expansion valve to an evaporator for cooling a fluid or gaseous medium that is connected to the thermally driven condensing unit, wherein a heat sink is formed as a vehicle cabin and/or a heating system of the motor vehicle, and wherein a heat source, connected to the thermally driven condensing unit, is formed as an exhaust gas heat exchanger of the motor vehicle.

5. The sorptive heat and cold storage system according to claim 4, wherein at least one operating medium valve for preventing backflow of an operating medium vapor from the sorption reactor to the evaporator is connected to the sorption reactor.

6. The sorptive heat and cold storage system according to claim 4, wherein the condenser is run to the fluid storage device, wherein a condensate valve is arranged between the condenser and the fluid storage device to prevent return of a condensed operating medium to the sorption reactor.

7. The sorptive heat and cold storage system according to claim 6, wherein the sorption reactor has a modular design, and wherein at least two modular sorption reactors are connected between the evaporator and the fluid storage device.

8. The sorptive heat and cold storage system according to claim 4, wherein the sorption reactor is connected to a plurality of alternative heat sinks.

9. The sorptive heat and cold storage system according to claim 4, wherein an air to be cooled by the evaporator is provided by a charge air cooler of the vehicle.

10. The sorptive heat and cold storage system according to claim 4, wherein an internal combustion engine of the motor vehicle, which is arranged in a heating circuit formed by the thermally driven condensing unit and the heat sink, is arranged downstream of the evaporator.

11. The sorptive heat and cold storage system according to claim 4, wherein the fluid storage device is a fluid collector.

* * * * *